United States Patent
Wright

(10) Patent No.: US 7,600,097 B1
(45) Date of Patent: Oct. 6, 2009

(54) DETECTING RAW HAZARDS IN AN OBJECT-ADDRESSED MEMORY HIERARCHY BY COMPARING AN OBJECT IDENTIFIER AND OFFSET FOR A LOAD INSTRUCTION TO OBJECT IDENTIFIERS AND OFFSETS IN A STORE QUEUE

(75) Inventor: Gregory M. Wright, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 114 days.

(21) Appl. No.: 11/516,320

(22) Filed: Sep. 5, 2006

(51) Int. Cl.
*G06F 9/312* (2006.01)

(52) U.S. Cl. .................................................. 712/216

(58) Field of Classification Search ................ 712/216, 712/217, 218, 219, 225
See application file for complete search history.

(56) References Cited

U.S. PATENT DOCUMENTS

| | | | | |
|---|---|---|---|---|
| 5,606,670 A | * | 2/1997 | Abramson et al. .......... 711/154 |
| 6,021,485 A | * | 2/2000 | Feiste et al. .................. 712/216 |
| 6,070,238 A | * | 5/2000 | Feiste et al. .................. 712/217 |
| 6,463,523 B1 | * | 10/2002 | Kessler et al. ............... 712/216 |
| 6,581,151 B2 | * | 6/2003 | Henry et al. ................ 711/203 |
| 6,662,280 B1 | * | 12/2003 | Hughes ....................... 711/156 |
| 7,065,632 B1 | * | 6/2006 | Col et al. .................... 712/218 |
| 2007/0288725 A1 | * | 12/2007 | Luick ......................... 712/225 |

* cited by examiner

*Primary Examiner*—David J Huisman
(74) *Attorney, Agent, or Firm*—Park, Vaughan & Fleming LLP

(57) ABSTRACT

One embodiment of the present invention provides a system that processes memory-access instructions in an object-addressed memory hierarchy. During operation, the system receives a load instruction to be executed, wherein the load instruction loads a data item from an object, and wherein the load instruction specifies an object identifier (OID) for the object and an offset for the data item within the object. Next, the system compares the OID and the offset for the data item against OIDs and offsets for outstanding store instructions in a store queue. If the offset for the data item does not match any of the offsets for the outstanding store instructions in the store queue, and hence no read-after-write (RAW) hazard exists, the system performs a cache access to retrieve the data item for the load instruction.

16 Claims, 4 Drawing Sheets

DETECTING RAW HAZARDS IN AN OBJECT-ADDRESSED MEMORY HIERARCHY BY COMPARING AN OBJECT IDENTIFIER AND OFFSET FOR A LOAD INSTRUCTION TO OBJECT IDENTIFIERS AND OFFSETS IN A STORE QUEUE

BACKGROUND

1. Field of the Invention

The present invention relates to computer systems that support references to objects defined within an object-oriented programming system. More specifically, the present invention relates to an efficient design for a store queue within an object-addressed memory hierarchy in a computer system.

2. Related Art

Out-of-order processors commonly include a store queue to facilitate maintaining program order and memory consistency. During program execution, entries for store instructions are inserted into the queue in-order as the store instructions are fetched. A subsequent load instruction compares its address against all older outstanding stores in the store queue to determine whether the load is dependent on a stored value which has not been written out to the memory hierarchy. Unfortunately, the memory address associated with a store may not be available until some time after the store is fetched (for example, if the address is dependent on other pending instructions). Consequently, subsequent loads may be delayed awaiting calculation of the store's address, since it is unknown whether the loads will depend on the store.

Conventional memory hierarchies form memory addresses by summing two operands, a base and offset. For accesses to objects, the offset is commonly a constant but the pointer to the object is a variable which is contained in a register. Even though the offsets may be known to be distinct, the store-load dependence cannot be resolved without the base pointers, because every bit in the store's address depends on the value of the pointer. For example, referring to FIG. 1, suppose a processor issues a store instruction (step 102) and then issues a load instruction (step 104). Also suppose the load generates an address A1, which is calculated by adding a pointer (from REG1) to an offset IMM1 (an immediate operand with a constant value) (step 106). At this point, if the store address does not exist in the store queue, the load must wait for the store address (step 108). When the store finally generates the store address A2 (step 110), which is calculated by adding the address in REG2 to IMM2, the system compares the load address A1 to A2 and all other store addresses for older outstanding store instructions, which are contained in the store queue (step 112). If A1 does not match any of these store addresses, the system retrieves the data item for the load from the cache (step 114). Otherwise, the system retrieves the data item for the load from the matching store queue entry as soon as the stored data item is available (step 116). Note that making the load instruction wait for the address of the preceding store instruction to be generated can significantly reduce instruction-level parallelism and processor throughput.

Hence, what is needed is a mechanism that facilitates early determination of store-load dependencies when accessing object fields.

SUMMARY

One embodiment of the present invention provides a system that processes memory-access instructions in an object-addressed memory hierarchy. During operation, the system receives a load instruction to be executed, wherein the load instruction loads a data item from an object, and wherein the load instruction specifies an object identifier (OID) for the object and an offset for the data item within the object. Next, the system compares the OID and the offset for the data item against OIDs and offsets for outstanding store instructions in a store queue. If the offset for the data item does not match any of the offsets for the outstanding store instructions in the store queue, and hence no read-after-write (RAW) hazard exists, the system performs a cache access to retrieve the data item for the load instruction.

In a variation on this embodiment, if the OID for the data item does not match any of the OIDs for outstanding store instructions in the store queue, and hence no RAW hazard exists, the system performs a cache access to retrieve the data item for the load instruction.

In a variation on this embodiment, if the offset for the data item matches offsets for one or more of the outstanding store instructions, the system waits until the OID of the data item is compared against the OIDs for the outstanding store instructions. If the OID of the data item does not match the OIDs for the one or more outstanding store instructions with matching offsets, and hence no RAW hazard exists, the system performs a cache access to retrieve the data item for the load instruction.

In a variation on this embodiment, if both the OID and the offset for the data item match an OID and an offset for an outstanding store instruction, and hence a RAW hazard exists, the system avoids the RAW hazard by retrieving the data item from an entry in the store queue for the outstanding store instruction, instead of retrieving the data item from a cache memory.

In a variation on this embodiment, each entry in the store queue includes: an OID; a valid flag for the OID indicating whether the value contained in the OID is valid; an offset; a valid flag for the offset indicating whether the value contained in the offset is valid; and a data field containing data for the store operation.

In a variation on this embodiment, the system is configured to receive a store instruction to be executed, wherein the store instruction specifies an OID and an offset. Upon receiving the store instruction, the system creates an entry in the store queue for the store instruction. Next, when the offset for the store instruction becomes available, the system stores the offset into the entry and sets the valid flag for the offset. (Note that if the offset is a constant, the offset will be immediately available.) Similarly, when the OID for the store instruction becomes available, the system stores the OID into the entry and sets the valid flag for the OID. The system also stores a data value into the data field of the entry when the data value becomes available. Note that by storing the offset into the entry before the OID is available, or by storing the OID into the entry before the offset is available, the system allows a subsequent load instruction to possibly determine that a RAW hazard does not exist without having to wait until both the OID and offset are available.

In a further variation, the OID for the store instruction is contained in a register which is indexed by the store instruction, and hence the OID for the store instruction must first be retrieved from the register before the OID for the store instruction can be stored into the entry.

In a further variation, the OID for the load instruction is contained in a register which is indexed by the load instruction, and hence the OID for the load instruction must first be retrieved from the register before the OID for the load instruction can be compared against OIDs for outstanding store instructions in the store queue.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 1:
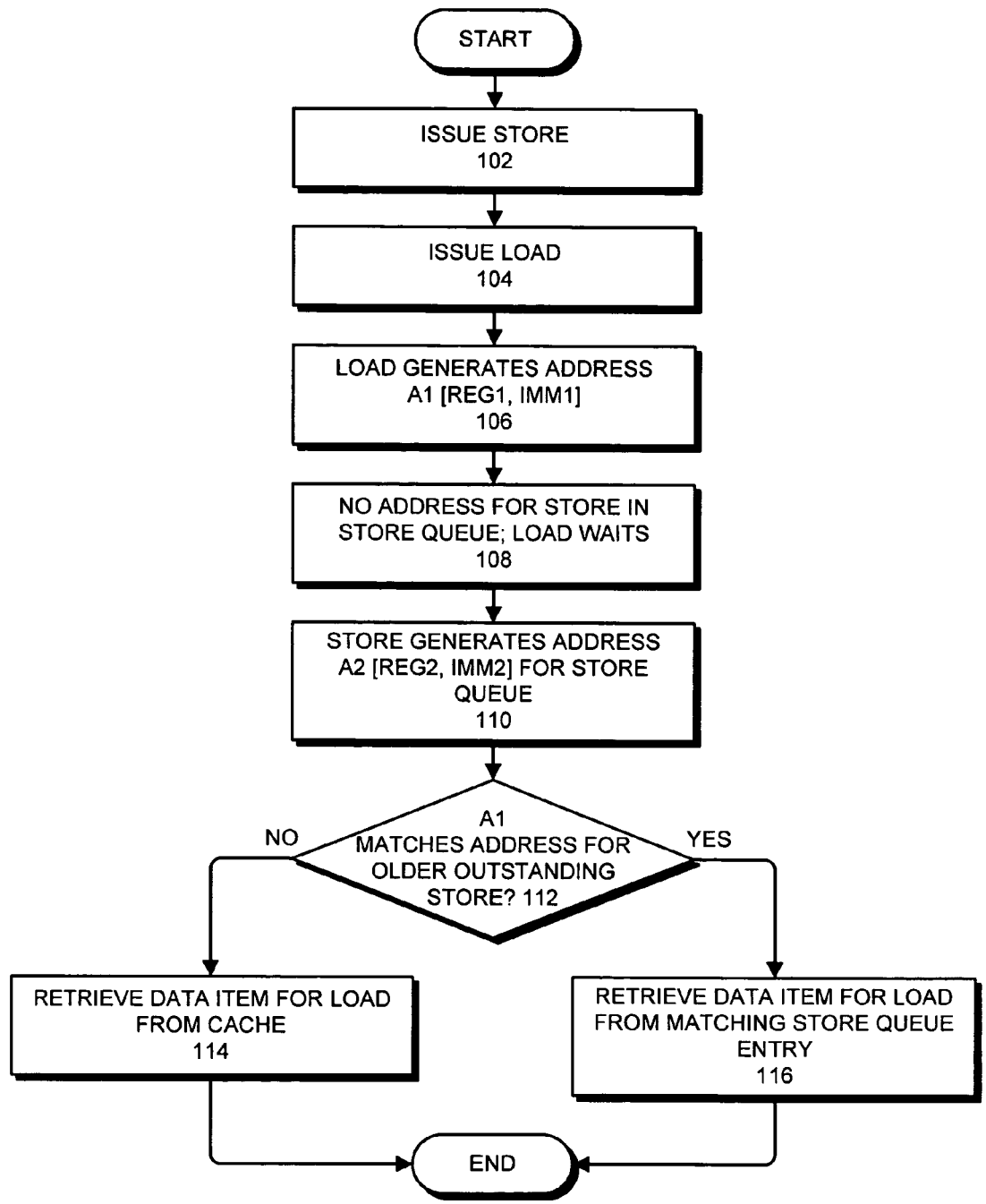
FIG. 1 presents a flow chart illustrating how load and store instructions are processed.
Figure 2:
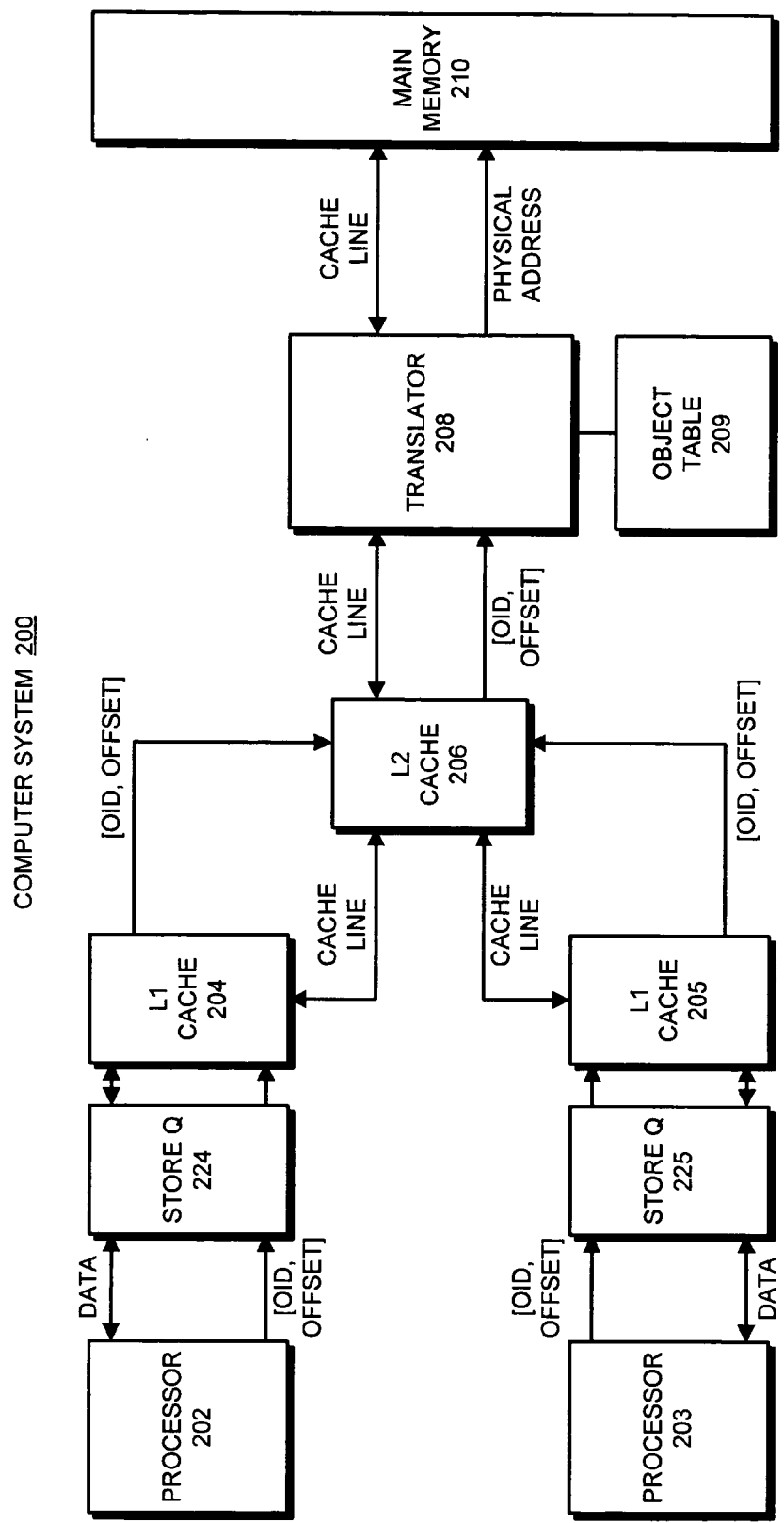
FIG. 2 illustrates a computer system in accordance with an embodiment of the present invention.

FIG. 2 illustrates a computer system 200 in accordance with an embodiment of the present invention. Computer system 200 can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 2, computer system 200 includes processors 202 and 203. Processors 202 and 203 access code and data from L1 caches 204 and 205, respectively. Note that L1 caches 204 and 205 can include unified instruction/data caches, or alternatively, separate instruction and data caches.

During a load operation involving a portion of an identifier-referenced object, processor 202 obtains the corresponding object identifier (OID) and offset and combines them to create an object address. Note that only minor modifications are required to conventional cache designs in order to provide for object caching using the above-described technique.

Note that after an object address is translated into an encoded address L1 cache 204, L1 cache 205 and L2 cache 206 can treat the encoded address in the same manner as a normal physical address.

If a given data item (or instruction) is not located within L1 cache 204 or L1 cache 205, it is retrieved from L2 cache 206. If it is not located within L2 cache 206, it is pulled into L2 cache 206 from main memory 210.

Unlike in a conventional memory hierarchy, a translator 208 is interposed between L2 cache 206 and main memory 210. Translator 208 converts an object address, comprising an object ID and an offset, into a corresponding physical address, which is sent to main memory 210.

If an object is not present within L2 cache 206, the encoded address is forwarded to translator 208. Translator 208 uses an object table 209 to translate the encoded address into a corresponding physical address. Each entry in object table 209 associates a given object ID with a corresponding physical address in main memory where the object resides.

When a cache miss for an object occurs in L2 cache 206, translator 208 intercepts the encoded address and extracts the object ID. Next, translator 208 uses the object ID to index into object table 209 to obtain a corresponding base physical address. Once the base physical address is obtained, translator 208 converts the load request for the object into a load request for a physical address in main memory 210.

The system uses the base physical address and the offset to locate a specific cache line (or cache lines) in main memory 210. Fetching circuitry within translator 208 directs the normal load hardware to issue a load instruction to main memory 210. This fetching circuitry subsequently receives the cache line corresponding to the physical address. The fetching circuitry then forwards the cache line to L2 cache 206.

In the event of an eviction from L2 cache 206, translator 208 converts the encoded address containing the object ID and the offset into a physical address. The fetching circuitry subsequently uses the physical address to generate one or more store operations to store the evicted cache line in main memory 210.

Note that processors 202 and 203 are configured to handle the address encoding procedure described above. In one embodiment of the present invention, a platform-independent virtual machine, such as a Java Virtual Machine, is modified to generate requests for portions of an object using an object ID and an offset. Moreover, in one embodiment of the present invention, processors 202 and 203 are configured to execute special instructions for performing load and store operations involving an object ID and an offset.

Although the present invention is described with reference to a computer system 200 with two levels of cache, the present invention can generally be used with any single-level or multi-level caching structure. Furthermore, although computer system 200 includes two processors, the present invention can generally be used with any number of processors.

Furthermore, computer system 200 includes store queues 224 and 225 which are specifically configured to handle loads and stores involving object IDs and offsets. These specially configured store queues 224 and 225 are described on more detail below.

Store Queues

A conventional store queue implements an associative lookup function, whereby the address of each load is compared against all older outstanding stores. Each entry in a conventional store queue has an address field and a flag to indicate that the address is valid. If the store has not completed its address generation, which is indicated by the valid flag, the result of the comparison is unknown and a subsequent load operation can be delayed.

Figure 3:
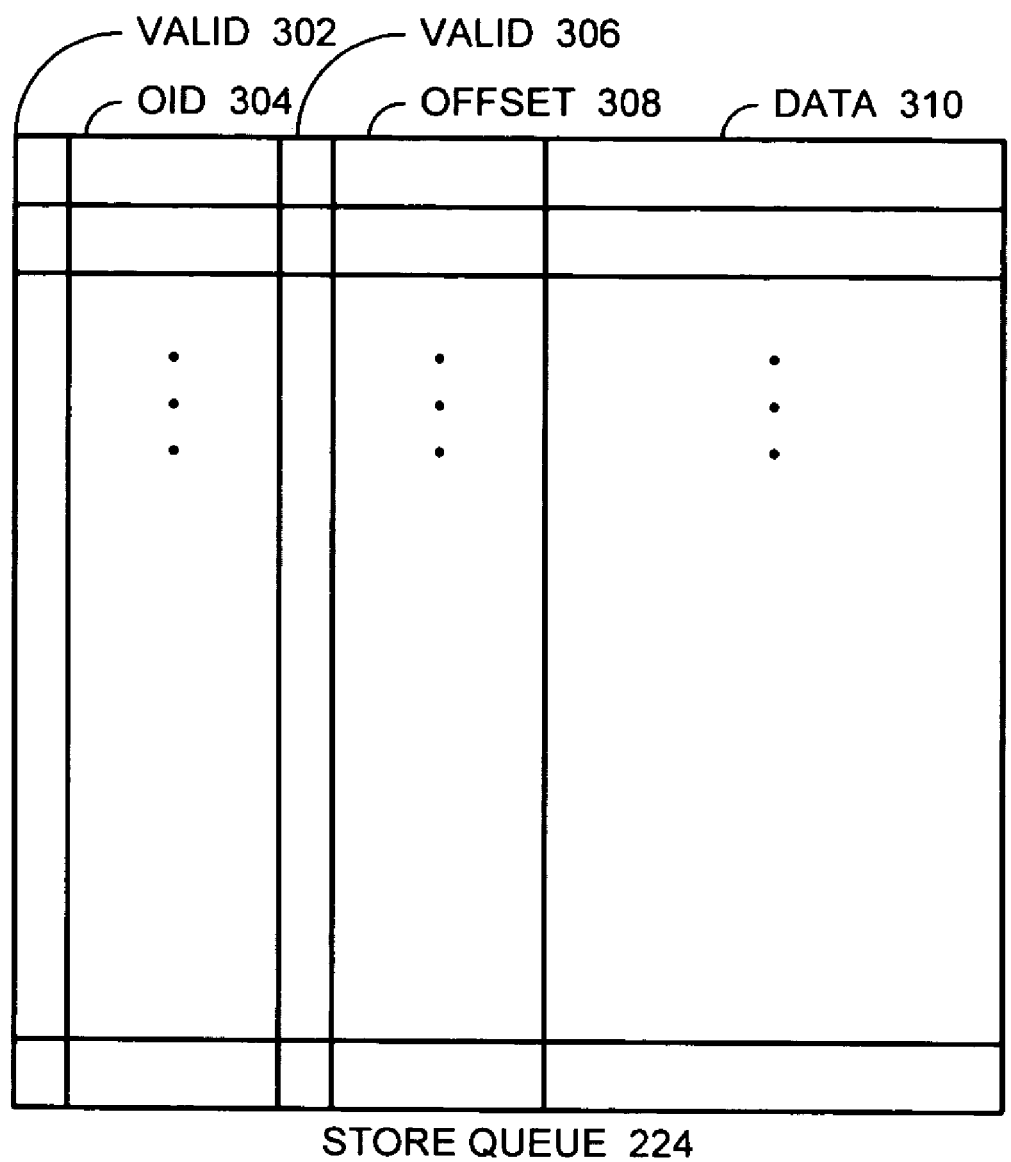
FIG. 3 illustrates a store queue in accordance with an embodiment of the present invention.

In the case of an object-addressed memory hierarchy, the object ID and offset are logically concatenated instead of being summed to produce the address. Thus, even if the target object ID of a store is unknown, a comparison of offsets may still suffice to determine that a load and store are independent. A system that performs this type of comparison can be implemented by augmenting each store queue entry to contain two valid flags, one for the object ID and one for the offset. More specifically, FIG. 3 illustrates a store queue 224 in which each entry contains an OID 304 and an associated valid flag 302, as well as an offset 308 and an associated valid flag 306. Each entry also includes a data item 310 to be written by the store operation.

When a load is compared against an outstanding store, a mismatch in either component indicates that the load and the store are independent (as long as that component is valid for the store). Since offsets are commonly compiled into the code as constants, the offsets are known as soon as the stores are decoded and may be inserted into the store queue well before the object ID is known. (Note that it may also happen that the object ID is known before the offset, but this case is likely to be rarer.)

Processing Load and Store Instructions

Figure 4:
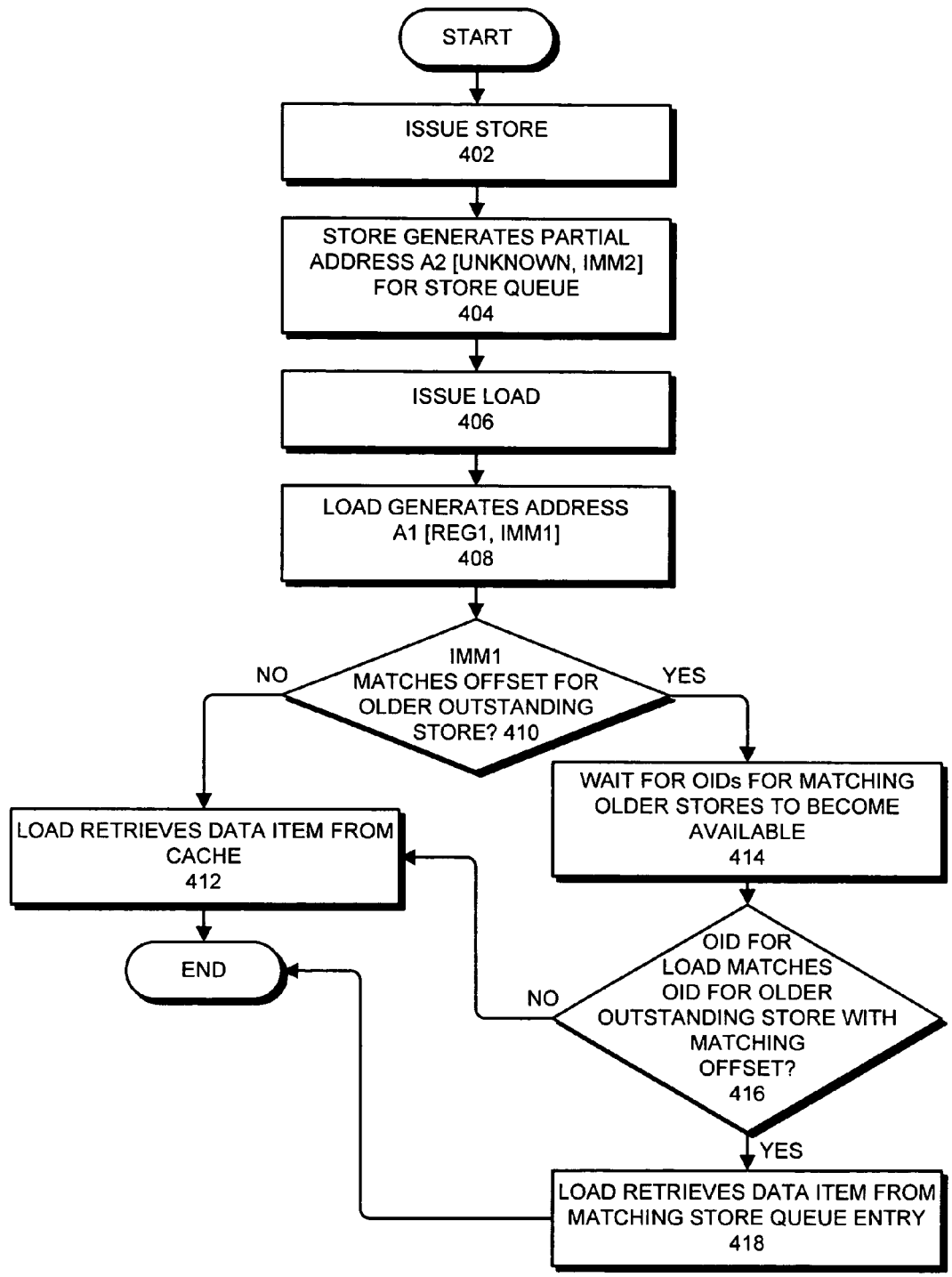
FIG. 4 presents a flow chart illustrating how load and store instructions are processed in accordance with an embodiment of the present invention.

FIG. 4 presents a flow chart illustrating how load and store instructions are processed in accordance with an embodiment of the present invention. Suppose a processor first issues a store instruction (step 402). This store instruction generates a partial address which includes the offset IMM2, but does not include the OID, because the OID must first be retrieved from a register (step 404). This partial address is stored in an entry for the store instruction in the store queue. Next, suppose the processor issues a load (step 406) and the load generates an address A1, which includes a pointer (contained in REG1) and an offset IMM1 (which is an immediate operand with a constant value) (step 408).

Next the system compares IMM1 against the offsets for all older outstanding store instructions which are contained in the store buffer (step 410). If IMM1 does not match any of the offsets for the outstanding store instructions, and hence no RAW hazard exists, the system performs a cache access to retrieve the data item for the load instruction (step 412).

Otherwise, if IMM1 matches offsets for one or more of the older outstanding store instructions, the system waits for the OIDs for the matching store instructions to become available (step 414) and then compares the OID for the load against the OIDs for the matching older store instructions (step 416).

If the OID for the load does not match the OIDs for the one or more older outstanding store instructions that have matching offsets, the system proceeds to step 412 to perform a cache access to retrieve the data item for the load instruction. Otherwise, a potential RAW hazed exists and the system retrieves the data item for the load from the matching store queue entry (step 418).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for processing memory-access instructions in an object-addressed memory hierarchy, comprising:
receiving at least one store instruction to be executed, wherein the store instruction specifies an object identifier (OID) and an offset;
creating an entry in a store queue for the store instruction, wherein the entry includes a valid flag for the offset and a separate valid flag for the OID;
when the offset for the store instruction becomes available, storing the offset into the entry and setting the valid flag for the offset;
when the OID for the store instruction becomes available, storing the OID for the store instruction into the entry and setting the valid flag for the OID; and
when a data value for the store instruction becomes available, storing the data value into a data field of the entry;
receiving a load instruction to be executed, wherein the load instruction loads a data item from an object, and wherein the load instruction specifies an OID for the object and an offset for the data item within the object;
comparing the OID and the offset for the load instruction against OIDs and offsets for outstanding store instructions in the store queue; and
if the offset for the load instruction does not match any of the offsets for the outstanding store instructions in the store queue, and hence no read-after-write (RAW) hazard exists, performing a cache access to retrieve the data item for the load instruction.

2. The method of claim 1, wherein if the OID for the load instruction does not match any of the OIDs for outstanding store instructions in the store queue, and hence no RAW hazard exists, the method further comprises performing a cache access to retrieve the data item for the load instruction.

3. The method of claim 1, wherein if the offset for the load instruction matches offsets for one of more of the outstanding store instructions, the method further comprises:
waiting until the OID for the load instruction is compared against the OIDs for the outstanding store instructions; and
if the OID for the load instruction does not match the OIDs for the one or more outstanding store instructions with matching offsets, and hence no RAW hazard exists, performing a cache access to retrieve the data item for the load instruction.

4. The method of claim 1, wherein if both the OID and the offset for the load instruction match an OID and an offset for an outstanding store instruction, and hence a RAW hazard exists, the method further comprises avoiding the RAW hazard by retrieving the data item from an entry in the store queue for the outstanding store instruction, instead of retrieving the data item from a cache memory.

5. The method of claim 1, wherein the OID for the store instruction is contained in a register which is indexed by the store instruction, and hence the OID for the store instruction must first be retrieved from the register before the OID for the store instruction can be stored into the entry.

6. The method of claim 1, wherein the OID for the load instruction is contained in a register which is indexed by the load instruction, and hence the OID for the load instruction must first be retrieved from the register before the OID for the load instruction can be compared against OIDs for outstanding store instructions in the store queue.

7. An apparatus that efficiently processes memory-access instructions in an object-addressed memory hierarchy, comprising:
an instruction-processing mechanism configured to receive a load instruction to be executed, wherein the load instruction loads a data item from an object, and wherein the load instruction specifies an object identifier (OID) for the object and an offset for the data item within the object;
wherein the instruction-processing mechanism is further configured to receive at least one store instruction to be executed, wherein the store instruction specifies an OID and an offset, and wherein the instruction-processing mechanism is further configured to:
create an entry in a store queue for the store instruction, wherein the entry includes a valid flag for the offset for the store instruction and a separate valid flag for the OID for the store instruction;

when the offset for the store instruction becomes available, store the offset for the store instruction into the entry and set the valid flag for the offset for the store instruction;

when the OID for the store instruction becomes available, store the OID for the store instruction into the entry and set the valid flag for the OID for the store instruction; and when a data value for the store instruction becomes available, store the data value into a data field of the entry;

a comparison mechanism configured to compare the OID and the offset for the load instruction against OIDs and offsets for outstanding store instructions in the store queue; and wherein if the offset for the load instruction does not match any of the offsets for the outstanding store instructions in the store queue, and hence no RAW hazard exists, the instruction-processing mechanism is configured to perform a cache access to retrieve the data item for the load instruction.

8. The apparatus of claim 7, wherein if the OID for the load instruction does not match any of the OIDs for outstanding store instructions in the store queue, and hence no RAW hazard exists, the instruction-processing mechanism is configured to perform a cache access to retrieve the data item for the load instruction.

9. The apparatus of claim 7, wherein if the offset for the load instruction matches offsets for one of more of the outstanding store instructions, the instruction-processing mechanism is configured to:

wait until the OID for the load instruction is compared against the OIDs for the outstanding store instructions; and if the OID for the load instruction does not match the OIDs for the one or more outstanding store instructions with matching offsets, and hence no RAW hazard exists, perform a cache access to retrieve the data item for the load instruction.

10. The apparatus of claim 7, wherein if both the OID and the offset for the load instruction match an OID and an offset for an outstanding store instruction, and hence a RAW hazard exists, the instruction-processing mechanism is configured to avoid the RAW hazard by retrieving the data item from an entry in the store queue for the outstanding store instruction, instead of retrieving the data item from a cache memory.

11. The apparatus of claim 7, wherein the OID for the store instruction is contained in a register which is indexed by the store instruction, and hence the OID for the store instruction must first be retrieved from the register before the OID for the store instruction can be stored into the entry.

12. The apparatus of claim 7, wherein the OID for the load instruction is contained in a register which is indexed by the load instruction, and hence the OID for the load instruction must first be retrieved from the register before the OID for the load instruction can be compared against OIDs for outstanding store instructions in the store queue.

13. A computer system which is configured to efficiently processes memory-access instructions in an object-addressed memory hierarchy, comprising:

a processor;

a memory;

an instruction-processing mechanism within the processor configured to receive a load instruction to be executed, wherein the load instruction loads a data item from an object, and wherein the load instruction specifies an object identifier (OID) for the object and an offset for the data item within the object;

wherein the instruction-processing mechanism is further configured to receive at least one store instruction to be executed, wherein the store instruction specifies an OID and an offset, and wherein the instruction-processing mechanism is further configured to:

create an entry in a store queue for the store instruction, wherein the entry includes a valid flag for the offset for the store instruction and a separate valid flag for the OID for the store instruction;

when the offset for the store instruction becomes available, store the offset into the entry and set the valid flag for the offset for the store instruction;

when the OID for the store instruction becomes available, store the OID for the store instruction into the entry and set the valid flag for the OID for the store instruction; and when a data value for the store instruction becomes available, store the data value into a data field of the entry;

a comparison mechanism within the processor configured to compare the OID and the offset for the load instruction against OIDs and offsets for outstanding store instructions in the store queue; and wherein if the offset for the load instruction does not match any of the offsets for the outstanding store instructions in the store queue, and hence no RAW hazard exists, the instruction-processing mechanism is configured to perform a cache access to retrieve the data item for the load instruction.

14. The computer system of claim 13, wherein if the OID for the load instruction does not match any of the OIDs for outstanding store instructions in the store queue, and hence no RAW hazard exists, the instruction-processing mechanism is configured to perform a cache access to retrieve the data item for the load instruction.

15. The computer system of claim 13, wherein if the offset for the load instruction matches offsets for one of more of the outstanding store instructions, the instruction-processing mechanism is configured to:

wait until the OID for the load instruction is compared against the OIDs for the outstanding store instructions; and if the OID for the load instruction does not match the OIDs for the one or more outstanding store instructions with matching offsets, and hence no RAW hazard exists, perform a cache access to retrieve the data item for the load instruction.

16. The computer system of claim 13, wherein if both the OID and the offset for the load instruction match an OID and an offset for an outstanding store instruction, and hence a RAW hazard exists, the instruction-processing mechanism is configured to avoid the RAW hazard by retrieving the data item from an entry in the store queue for the outstanding store instruction, instead of retrieving the data item from a cache memory.

* * * * *

UNITED STATES PATENT AND TRADEMARK OFFICE
CERTIFICATE OF CORRECTION

PATENT NO.      : 7,600,097 B1                          Page 1 of 1
APPLICATION NO. : 11/516320
DATED           : October 6, 2009
INVENTOR(S)     : Gregory M. Wright It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 145 days.

Signed and Sealed this

Fifth Day of October, 2010

David J. Kappos
*Director of the United States Patent and Trademark Office*